United States Patent
Andersson et al.

(10) Patent No.: US 9,619,934 B2
(45) Date of Patent: Apr. 11, 2017

(54) METHOD AND AN APPARATUS FOR ESTIMATING VALUES FOR A SET OF PARAMETERS OF AN IMAGING SYSTEM

(71) Applicant: VRICON SYSTEMS AKTIEBOLAG, Linkoeping (SE)

(72) Inventors: Ingmar Andersson, Linkoeping (SE); Johan Bejeryd, Linkoeping (SE); Johan Borg, Linkoeping (SE); Per Carlbom, Linkoeping (SE); Leif Haglund, Brokind (SE); Folke Isaksson, Linkoeping (SE)

(73) Assignee: Vricon Systems Aktiebolag, Linkoeping (SE)

( * ) Notice: Subject to any disclaimer, the term of this patent is extended or adjusted under 35 U.S.C. 154(b) by 0 days.

(21) Appl. No.: 14/425,583

(22) PCT Filed: Jan. 21, 2013

(86) PCT No.: PCT/SE2013/050043
§ 371 (c)(1),
(2) Date: Mar. 3, 2015

(87) PCT Pub. No.: WO2014/112910
PCT Pub. Date: Jul. 24, 2014

(65) Prior Publication Data
US 2015/0254899 A1 Sep. 10, 2015

(51) Int. Cl.
*H04N 13/02* (2006.01)
*G06T 17/05* (2011.01)
(Continued)

(52) U.S. Cl.
CPC ............ *G06T 17/05* (2013.01); *G01B 11/245* (2013.01); *G01C 11/06* (2013.01);
(Continued)

(58) Field of Classification Search
None
See application file for complete search history.

(56) References Cited

U.S. PATENT DOCUMENTS

| | | |
|---|---|---|
| 5,345,086 A | 9/1994 | Bertram |
| 2005/0099637 A1* | 5/2005 | Kacyra ............... G01B 11/002 356/601 |

(Continued)

FOREIGN PATENT DOCUMENTS

| | | |
|---|---|---|
| DE | 102010042821 A1 | 4/2012 |
| WO | WO 01/69535 A2 | 9/2001 |
| WO | WO 2011/093752 A1 | 8/2011 |

OTHER PUBLICATIONS

Born, M., et al., "Principles of Optics: Electromagnetic Theory of Propagation, Interference and Diffraction of Light", Fourth Edition, 1970, Pergamon Press, Great Britain.
(Continued)

*Primary Examiner* — Dakshesh Parikh
(74) *Attorney, Agent, or Firm* — Alston & Bird LLP

(57) ABSTRACT

A method for estimating values for a set of parameters of an imaging system is presented. At least two pictures having an overlapping area are taken with the imaging system from different positions. Pulses are sent out to the area, the reflected pulses are detected and distances between a sender of the pulses and the respective point where the pulses were reflected are calculated based on the travel time of the pulses. First information about the area is calculated based on the pictures. Second information related to the calculated distances to the area is also calculated. Values for quantities contained in the first and second information are compared. If the value for a quantity obtained from the first information differs from the value obtained from the second information,
(Continued)

values and/or an error estimate for the set of parameters of the imaging system is calculated based on the difference.

19 Claims, 6 Drawing Sheets

(51) Int. Cl.
| | |
|---|---|
| G01C 11/06 | (2006.01) |
| G01B 11/245 | (2006.01) |
| G01S 17/02 | (2006.01) |
| G01S 17/42 | (2006.01) |
| G01S 17/89 | (2006.01) |
| G01M 11/02 | (2006.01) |
| H04N 5/357 | (2011.01) |
| G06T 7/00 | (2017.01) |
| G01S 13/86 | (2006.01) |
| H04N 13/00 | (2006.01) |

(52) U.S. Cl.
CPC ....... *G01M 11/0264* (2013.01); *G01S 13/867* (2013.01); *G01S 17/023* (2013.01); *G01S 17/42* (2013.01); *G01S 17/89* (2013.01); *G06T 7/0022* (2013.01); *G06T 7/0032* (2013.01); *G06T 7/0046* (2013.01); *G06T 7/0057* (2013.01); *G06T 7/0071* (2013.01); *H04N 5/3572* (2013.01); *H04N 13/0275* (2013.01); *G06T 2207/10004* (2013.01); *G06T 2207/10032* (2013.01); *G06T 2207/20182* (2013.01); *G06T 2207/30181* (2013.01); *H04N 2013/0085* (2013.01)

(56) References Cited

U.S. PATENT DOCUMENTS

| | | | | |
|---|---|---|---|---|
| 2006/0006309 | A1* | 1/2006 | Dimsdale | G01C 11/06 250/206.1 |
| 2006/0007422 | A1* | 1/2006 | Dimsdale | G01S 7/4865 356/5.04 |
| 2006/0215935 | A1* | 9/2006 | Oldroyd | G01C 11/00 382/294 |
| 2007/0031064 | A1 | 2/2007 | Zhao et al. | |
| 2011/0090337 | A1* | 4/2011 | Klomp | G01C 11/025 348/144 |
| 2012/0257792 | A1 | 10/2012 | Simon | |

OTHER PUBLICATIONS

Indelman, V., et al., "Mosaic Aided Navigation: Tools, Methods and Results", *Position Location and Navigation Symposium (PLANS)*, 2010, pp. 1212-1225, IEEE, US.

International Searching Authority, International Search Report and Written Opinion for International Application No. PCT/SE2013/050043, Nov. 5, 2013, 9 pages, Swedish Patent and Registration Office, Sweden.

Olson, Clark F., et al., "Wide-baseline stereo vision for terrain mapping", *Machine Vision and Applications*, 2010, vol. 21, pp. 713-725, Springer, Germany.

Reid, D. B., et al., "An Optimally Integrated Track Recovery System for Aerial Bathymetry", *IEEE Transactions on Aerospace and Electronic Systems*, Sep. 1983, pp. 751-760, vol. AES-19, No. 5, IEEE, US.

European Patent Office, Extended European Search Report for Application No. 13871978.6, Jul. 15, 2016, 9 pages, Germany.

Mavrinac, Aaron, et al., "Calibration of Dual Laser-Based Range Cameras for Reduced Occlusion in 3D Imaging", *Proceedings of 2010 IEEE/ASME International Conference on Advanced Intelligent Mechatronics*, Jul. 6-9, 2010, pp. 79-83, IEEE, U.S.A.

Underwood, James P., et al., "Error Modeling and Calibration of Exteroceptive Sensors for Accurate Mapping Applications", *Journal of Field Robotics*, Jan. 2010, pp. 2-20, vol. 27, No. 1, Wiley Periodicals, Inc., U.S.A.

\* cited by examiner

METHOD AND AN APPARATUS FOR ESTIMATING VALUES FOR A SET OF PARAMETERS OF AN IMAGING SYSTEM

CROSS REFERENCE TO RELATED APPLICATION

This application is a National Stage Application, filed under 35 U.S.C. §371, of International Application No. PCT/SE2013/050043, filed Jan. 21, 2013, the contents of which are hereby incorporated by reference in their entirety.

BACKGROUND

Related Field

The present invention relates to method for estimating values for a set of parameters of an imaging system and to an apparatus arranged to take pictures with an imaging system using a method for estimating values for a set of parameters of the imaging system.

Description of Related Art

Optical imaging systems in practice never give a perfect image of a scene which is photographed. This is due to a lot of physical effects like aberration and well described in books about optics, like "Principles of Optics" by Max Born and Emil Wolf. However, there exist a lot of different techniques to minimise aberrations and to correct, at least partially, some of them. These minimisations and corrections can be done in the imaging systems itself, for example, by careful design of them. If the imaging system gives pictures which are accessible electronically, for example, via scanning them or via taking them directly via a CCD (charge-coupled device)-camera or a camera using a CMOS (complementary metal-oxide-semiconductor)-sensor, a correction could also be done with the help of computer programs.

Often, it is desirable to get information from a picture about the scene or objects which are on a picture. This could, for example, be size, shape, colour or other properties of the scene or the objects. For being able to get this information one needs to know some properties of the optical system, for example, one or more of the following properties: focal length(s), field of view, thicknesses and positions of the lenses, indexes of refraction, distortions. These properties are either known, or could be measured to calibrate the imaging system. The calibration can, for example, be done by test pictures with known properties, or by photographing other known objects. In these calibration procedures one usually uses a mathematical/physical model to conclude from the properties of a picture to the properties of the imaging system.

However, the pre-known values of the parameters of the imaging system or the values of the parameters of the imaging system obtained from the calibration procedure can change by time. Mechanical stress might change the relative position of the different components in the imaging system. This might, for example, result in that components get closer or further away, that components might turn relative to each other or that components might be moved closer to or further away from the optical axis. A change of temperature might also change the relative position of the components, for example, if the components are mounted on a common rail or on a common tube (or any other common holding element) and that holding element expands or contracts due to a change in temperature. Also the index of refraction of some components or the performance of some components, like CCD-chips, can change by a change in temperature. Even other influences from the environment can change the components of the imaging system and/or the properties of them, resulting in an imaging system, which behaves differently than when it was calibrated. When one tries to make conclusions from the pictures of such a differently behaving system about the scene or the object(s) which have been photographed, one might end up at wrong information about the scene or the object(s).

Prior art solutions to solve that problem try to minimise any possible changes by careful design of the imaging system or by real-time monitoring different parameters of the imaging system. However, careful design can make the systems complex and heavy and might only minimise the above mentioned changes in the imaging system, but never completely eliminate them. Also real-time monitoring can make the systems complex and heavy and it might be hard to monitor all possible changes in the system.

Especially when the imaging system is mounted on airplanes high temperature changes and high mechanical stress might occur, resulting to change the behaviour of the imaging system in such a way that careful design does not protect against all possible effects from the environment and that monitoring of all the parameters needed is not feasible due to space constraints and due to fact that the monitoring systems of all important parameters might be affected by the same stress and therefore might malfunction due to the tough environment.

BRIEF SUMMARY

It is the object to obviate at least some of the above disadvantages and provide an improved imaging system.

This has in one example been achieved by means of a method for estimating values for a set of parameters of an imaging system. The method comprises taking at least two pictures with the imaging system, where the at least two pictures are taken from different positions and where the at least two pictures comprise an at least partially overlapping area, and sending out pulses to the at least partially overlapping area. The reflected pulses are detected and distances between a sender of the pulses and the respective point where the pulses were reflected are calculated based on the travel time of the pulses. Further, positioning data is associated to the pictures and to the calculated distance between the respective reflection point and the sender of the pulses. The positioning data comprises a position and pointing direction of the imaging system and the sender of the pulses. Further, first information about the area is calculated based on the at least two pictures. The first information comprises at least one quantity of the area. The at least one quantity comprises size and/or position.

Second information is calculated, said second information relating to the calculated distances to the at least partly overlapping area. The second information comprises at least one quantity of the area. The at least one quantity comprises size and/or position.

Values for the quantities contained in the first and second information are compared. If the value for at least one quantity of the area obtained from the first information differs from the value for the corresponding at least one quantity of the area obtained from the second information, values or an error estimate for the set of parameters of the imaging system is calculated based on the difference.

When doing a scanning for example of the Earth's surface or when one wants to take pictures of the Earth's surface one might want to know the set of parameters of the imaging system with high accuracy. The set of parameters of the imaging system might change slightly for example due to changes in temperature, due to stress on the components of the imaging system, due to atmospheric conditions or due to other reasons. For attaining good knowledge of what area of the Earth's surface is shown on the picture taken for example from a flying object like airplanes or satellites it is therefore desired to have good knowledge of the values of the set of parameters of the imaging system.

The system for sending out pulses and for detection of received pulses is calibrated against the imaging system in that respect, that it is known in which direction relative to the direction of the imaging system the sender for pulses is sending its pulses and in that it is known at which position relative to the position of the imaging system the sender for the pulses and a detection element is situated. It may also be known the geological reference position of the imaging system and/or sender of the pulses, i.e. its relation to the Earth's surface. In one example the pulses are sent substantially simultaneously when taking pictures. A point cloud of pulses is provided at the same area where the picture was taken from. Thereby, the information from the imaging system and the provided point cloud of pulses can then be used to provide a better estimate of the set of parameters of the imaging system.

In one example a 3D-surface of the at least partially overlapping area is calculated based on the at least two pictures. The first information about the area is then calculated based on the calculated 3D-surface.

In one example a point correspondence is calculated between points where the pulses were reflected and the corresponding points in the at least two pictures.

Preferred embodiments have at least some of the features of the appended dependent claims.

DETAILED DESCRIPTION OF VARIOUS EMBODIMENTS

Figure 1:
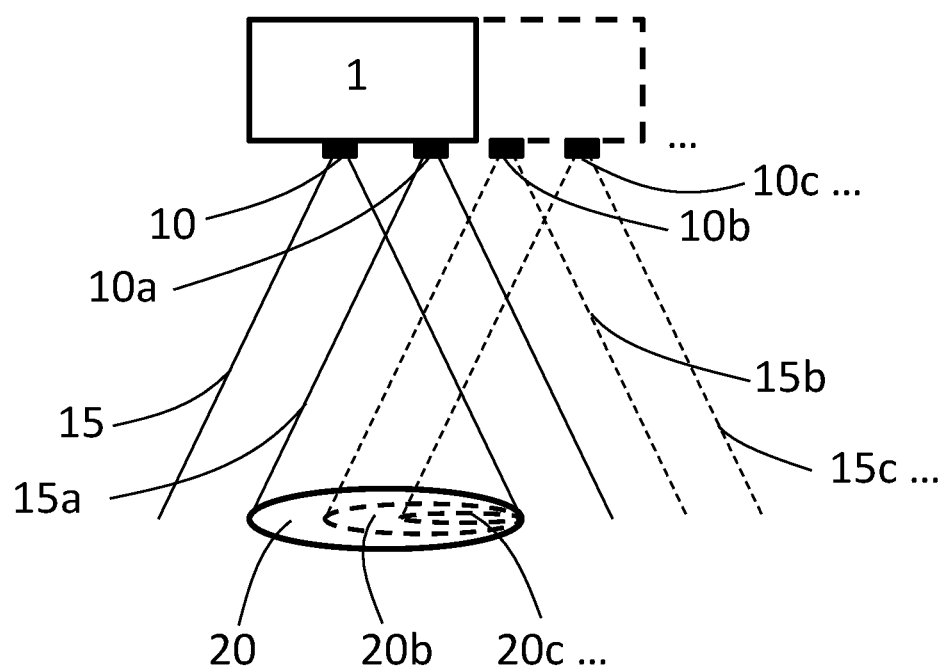
FIG. 1 shows schematically a part of one embodiment of the apparatus according to the invention, where pictures are taken by an imaging system 1.

In FIG. 1, parts of the working principle of an apparatus according to this document are shown schematically. In this embodiment of the apparatus, an imaging system 1 comprises a set of elements 10, 10a, 10b, 10c, . . . arranged to take pictures. In this embodiment there are at least two elements arranged to take pictures 10, 10a, 10b, 10c, . . . . There is in principle no upper limit to the number of elements, however cost and space will most likely put limits to how many elements 10, 10a, 10b, 10c, . . . are reasonable. The elements arranged to take pictures 10, 10a, 10b, 10c, . . . preferably comprise at least one camera each. In one preferable embodiment the cameras are CCD (charge-coupled devices) cameras. However, even other kinds of cameras are possible, for example cameras with CMOS (complementary metal-oxide-semiconductor)-sensors. When using CCD-cameras this results in that the pictures taken by the elements 10, 10a, 10b, 10c, . . . are available electronically and could be easily processed or analysed. This processing or analysing could be done by a calculating element, for example, a computer (not shown in the Figure). This calculating element is in one embodiment coupled to the imaging system 1 and can be the processing unit 54 (not shown in the Figure). Thereby analysing and/or processing are performed close to the time when the pictures are taken. In another embodiment a processing and/or analysing of the pictures could be done at any later time. The calculation element does then not need to be attributed to the imaging system 1.

The picture taking elements 10, 10a, 10b, 10c, . . . are positioned at different places on the imaging system 1, thereby assuring, if pictures are taken simultaneously by different elements 10, 10a, 10b, 10c, . . . , that these pictures are taking from different positions. In one embodiment the elements 10, 10a, 10b, 10c, . . . allow to take pictures from varying and/or different angles. Assuming a fixed scene this implies different pointing directions of the imaging system 1. In another embodiment the elements 10, 10a, 10b, 10c, . . . are fixed in relation to each other such that pictures are always taken from the same angles.

Every picture taking element 10, 10a, 10b, 10c, . . . has a corresponding field of view 15, 15a, 15b, 15c, . . . . The field of views 15, 15a, 15b, 15c, . . . of at least two elements 10, 10a, 10b, 10c, . . . are oriented in such a way, that the pictures taken by the imaging system 1 overlap at least partially. In FIG. 1 this is schematically shown for some examples. The area 20 is the overlap of the area shown on the pictures taken by element 10 and element 10a. The area 20b is the overlap of the area shown on the pictures taken by element 10 and element 10b, or the pictures taken by element 10, element 10a and element 10b. The area 20c is the overlap of the area shown on the pictures taken by element 10 and element 10c, or the pictures taken by element 10, element 10a and element 10c, or the pictures taken by element 10, element 10b and element 10c, or the pictures taken by element 10, element 10a, element 10b and element 10c.

In one embodiment the imaging system 1 is mounted on a movable platform. This movable platform is in one embodiment an airplane. In another embodiment the movable platform is a satellite. Even any other kind of movable platform is possible, such as, but not limited to, a car, a helicopter, a rail-bounded vehicle or apparatus, a boat, a submarine, a balloon, other kind of vehicles, an animal or a human being. If the imaging system 1 is mounted on a movable platform different pictures can be taken from different positions. When the imaging system 1 is chosen to move up or down in relation to the areas, a move of the imaging system 1 will increase or decrease the areas 20, 20b, 20c, . . . . Thus, when knowing the field of views 15, 15a, 15b, 15c, . . . and the relative positions of the elements 10, 10a, 10b, 10c, . . . , and when measuring the ratio between one of the overlapping areas 20, 20b, 20c, . . . and the whole picture taken from the corresponding element 10, 10a, 10b, 10c, . . . the distance between the imaging system 1 and the areas 20, 20b, 20c, . . . can be calculated via basic geometrical relations. This involves everyday normal operations to the person skilled in the art.

The imaging system 1 is showing as taking pictures downwards, however, any other orientation is possible. Similar reasoning for the geometrical relations as above applies for any other direction.

Also a 3D scene reconstruction is possible for the overlapping area. For this 3D scene reconstruction from 2D images several methods are known by those skilled in the art.

When doing a 3D scene reconstruction and when knowing position, pointing direction and field of view of the elements 20, 20b, 20c, ..., one is able to attribute a three-dimensional coordinate to every point in the partially overlapping area of a picture.

Figure 2:
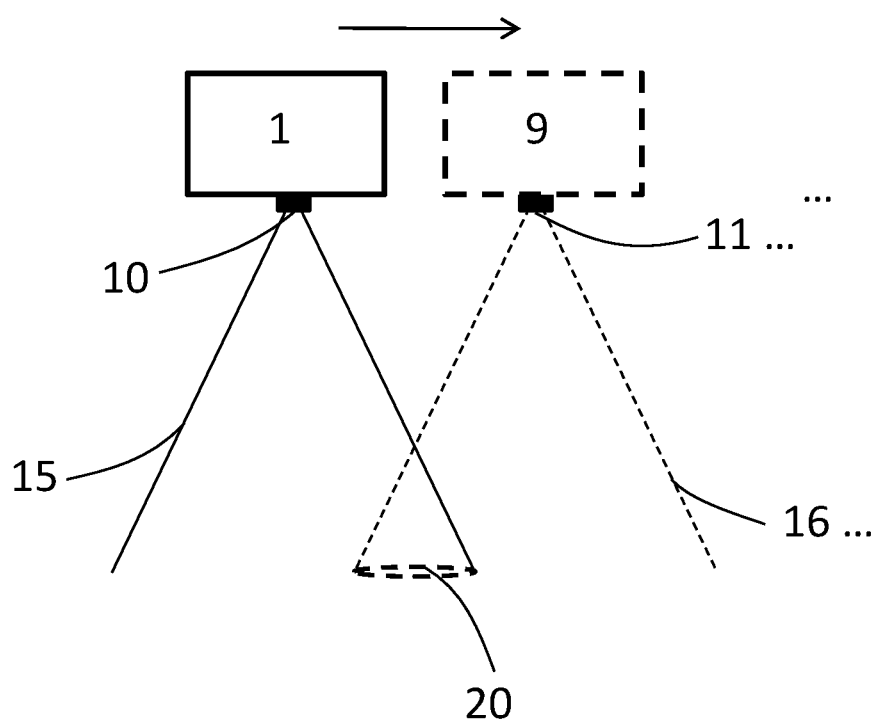
FIG. 2 shows schematically a part of another embodiment of the apparatus according to the invention, where pictures are taken by an imaging system 1.

In FIG. 2, another embodiment is shown. Compared to FIG. 1, here, the imaging system 1 only has one element 10 arranged to take pictures. As in the previous example this element 10 has a field of view 15. When the imaging system 1 is moving to another position as indicated by the arrow it might for example arrive at the position indicated by 9. At that position the element for taking pictures will be at the position indicated by 11 and will have a field of view 16. When taking a picture from these two positions an overlapping area 20 of these two pictures is provided. As explained in the description of FIG. 1, the distance between the position 10 and 11, and the position of the area 20 can be determined based on the relative position 10 and 11 and the field of views 15 and 16 (for example attained with the help of a GPS-receiver), and a measured and/or calculated ratio between the area 20 and the total area of a picture taken from when the said element is at position 10 and/or 11.

Here, only two positions are shown from where pictures are taken. However, it should be noted that pictures could be taken from more than two positions and with different angles as long as there is some overlapping area 20 of the pictures.

Even combinations of what is shown in FIG. 1 and FIG. 2 are possible. In one embodiment an imaging system 1 has several elements 10, 10a, 10b, 10c, ... and is moving and thus can take pictures from different positions of the said several elements 10, 10a, 10b, 10c.

Positioning data is associated to the pictures. The positioning data comprises the position and the pointing direction of the imaging system 1 and/or at least the elements 10 (or 10, 10a, 10b, 10c, ... ). In one embodiment this is achieved by having a GPS (global positioning system)-receiver (not shown in the Figures) associated to the imaging system 1. This GPS-receiver is in one embodiment arranged to provide a positioning signal every time a picture is taken. The positioning signal is in one embodiment saved together with the picture. In one embodiment it is used for immediate further procession and/or analysis of the picture. Even any other kind of positioning or navigation system is possible to use for the present invention. Some other examples are GNSS (global navigation satellite system) like GLONASS, GALILEO and/or BEIDOU. Even other kinds of systems are possible as long as they are able to give positioning information about the imaging system 1.

The pointing direction of the imaging system 1 is in one embodiment calculated from the measurements of a gyroscopic system. In one embodiment the pointing direction of the imaging system 1 is calculated from the measurement results of an inertial measurement unit (IMU). Both systems are well known by the state of the art. The gyroscopic system or the IMU is associated to the imaging system 1 (not shown in the Figure). In one example it is directly attributed to the imaging system 1. In another example, it is attributed to the movable platform as described above. If the relative position and the relative angle between the imaging system and the movable platform is kept fix one can directly conclude from the results of the gyroscopic system or the IMU system for the movable platform to the corresponding values of the imaging system 1. However, any other kind of system for measuring the pointing direction of the imaging system 1 can be used as well. The information contained from such a system is then used in a corresponding manner as described for the positioning data above. The information coupled to the pointing direction is associated to the pictures.

In one example the positioning and/or navigation system and the gyroscopic system and/or the IMU are comprised in a positioning data unit 51 (not shown in the Figure).

Figure 3:
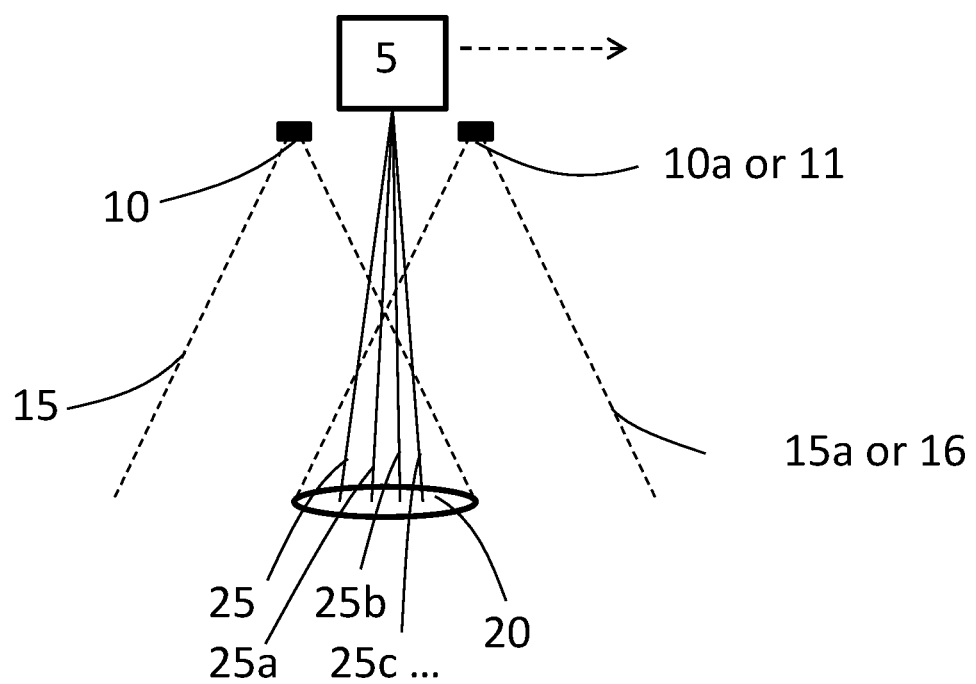
FIG. 3 shows schematically another part of an embodiment of the apparatus according to the invention, where laser signals are sent out to a partially overlapping area of at least two pictures from the imaging system 1.

In FIG. 3 an arrangement sends out pulses to an area as described in relation to the Figures above. The parts as described by FIG. 1 and FIG. 2 which are relevant to understand FIG. 3 are given by the same numbers as in FIG. 1 and/or FIG. 2.

In the following, if the terms measuring the distance, a measured distance, or a similar term, are used, these terms can contain steps of calculation to provide a value for the distance. This calculation is in one example a calculation which concludes from the measured travel time of a pulse and the known speed of the pulse, often equivalent to the speed of light, to the measured distance via simple physical relations. In any case, the terms measuring or measurement should not be interpreted as to exclude simple calculations needed to achieve the measurement value.

A sender 5 is arranged to send pulses to an overlapping area 20. This sender 5 is preferably a laser and preferably arranged in a lidar (light detection and ranging)-configuration, from now on called lidar system. The lidar system is in one embodiment sending out pulses in a fixed direction. In another embodiment the lidar system is a scanning lidar. The lidar system is measuring the distance between the lidar system and one or more points of the overlapping area 20 as well known for those skilled in the state of the art. This is indicated by the rays of the laser pulse(s) 25, 25a, 25b, 25c, . . . . In one embodiment the lidar system is directly attributed to the imaging system 1. In another embodiment the lidar system is mounted on the same platform as the imaging system 1. In one embodiment the lidar system always keeps its relative position to the imaging system 1. This is achieved, for example, by mounting it on the same platform. The lidar system attributes positioning data comprising a position and pointing direction of the lidar system to the measured distances. This positioning data can be achieved in the same way as the positioning data for the imaging system 1. In one example the same systems (for example, gyroscopic system or IMU system or other system for pointing direction and, for example, GPS or other positioning system for the position) as for the positioning data for the image system 1 are used to get the positioning data of the lidar system.

In one embodiment pulses from the lidar system are sent out at the same time when the pictures are taken. In one embodiment the pulses from the lidar system are sent out independently from the fact when the pictures are taken. In one example the pulses from the lidar system are used to produce a so called point cloud, as known by those skilled in the art of lidar systems. In one example timing data is associated to measured distances. In one example this timing data is the time the pulse was sent out. In one example this timing data is the time when the reflected pulse was detected. In one example the timing data is provided through a time measuring device, for example, a clock (not shown in the figure).

In one example timing data is associated to the pictures. This timing data is in one example the time a picture has been taken.

Everything stated above for the lidar system can also be done by any other laser system able to measure the distances. In one embodiment systems for measuring the distances are used, which not contain lasers. In one example such a system is a radar system. Especially when the platform is a satellite a radar system might under some circumstances be preferable over a laser system, for example for not being limited by the fact whether there are clouds or not. In general, any distance measuring device can be used. Especially, a device using electromagnetic radiation to measure the distance, for example, through measuring the time a pulse travelled between sending it out and being detected on back-reflection to a detector, could be used.

However, the system is not limited to electromagnetic radiation. In some embodiments, for example for underwater imaging systems, other systems, like sonar system, are preferable.

Figure 4:
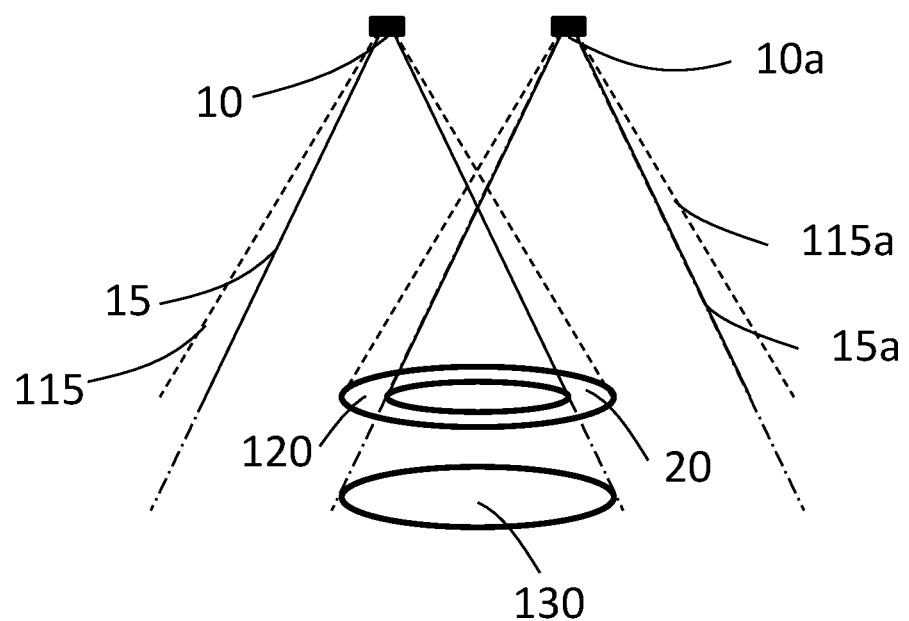
FIG. 4 shows schematically how one can get an updated value or an error estimate for the field of view, as an example of a parameter of an imaging system 1.

In FIG. 4 an example is shown of what happens if a real value of a parameter from an imaging system 1 differs from an assumed value of this parameter. In the example of FIG. 4 a difference in the field of view of the imaging system 1 is shown. Here, an embodiment of a system as described in FIG. 1 is used; however, the working principle could be easily adapted to any other embodiment disclosed in this description, for example, an embodiment according to FIG. 2 or a combination of FIG. 1 and FIG. 2. In FIG. 4 the assumed field of views 15, 15a of elements 10, 10a arranged to take pictures are shown. It is also shown the real field of view 115, 115a of these elements 10, 10a. The assumed field of views 15, 15a would result in a partially overlapping area 20 of the pictures taken. The real field of views 115, 115a on the other hand, result in a partially overlapping area 120. Since one is assuming the field of views 15, 15a and getting the partially overlapping area 120 on the pictures taken by the imaging system 1 this will result in the fact that the imaging system 1 (and/or some analysing unit which analyses the pictured from the imaging system) wrongly assumes that the partially overlapping area 120 is placed at the position 130 instead. The position 130 of the partially overlapping area as assumed by the imaging system 1 can be geometrically constructed by moving the area 120, in this example, up or down until its borders lie at the borders of the assumed field of views 15, 15a. In FIG. 4 the extensions of the borders of the assumed field of views 15, 15a are shown with dash-dotted lines. In the discussed example, with a field of view 115, 115a which is wider than the assumed field of view 15, 15a, the imaging system 1 will assume the partially overlapping area 120 at a position 120 which is further away from the imaging system 1 than in reality, On the other hand, in case the real field of view is smaller than the assumed field of view 15, 15a, the assumed position of the partially overlapping area would be closer to the imaging system 1 than in reality (not shown in the figure).

Now, if the position of the imaging system 1 is known through the associated positioning data, the position of the sender system 5 (not shown in FIG. 4) is known through the associated positioning data, and the distance between the sender system 5 and the partially overlapping area 120 is known, one can use this information to conclude that the partially overlapping area is not positioned at position 130 in reality, but at its real position where the partially overlapping area 120 is shown on FIG. 4. Since an imaging system 1 with the assumed field on views 15, 15a would not be able to take pictures of the partially overlapping area 120 one can deduce that the assumed field of views 15, 15a are wrong and that the real field of views are 115 and 115a instead. The information thus gives an updated value for the field of view and/or provides an error estimate for the field of views.

Also values for other parameters of the imaging system 1 can be estimated. When doing a calculation of the 3D-surface, a 3D-coordinate $\hat{X}_p = (x_p, y_p, z_p)$ can be attributed to every point on the 3D-surface (and thus on the overlapping area in the pictures). If one or more parameters of the imaging system 1 are not exactly known, the 3D-coordinate $\hat{X}_p$ may be erroneous. In the above example of the field of view, the $z_p$-coordinate of $\hat{X}_p$ is erroneous. In general, $\hat{X}_p$ will be a function of all n parameters $\rho_1, \rho_2, \ldots, \rho_n$ in the set of parameters $\{\rho_1, \rho_2, \ldots, \rho_n\}$, where n is a non-negative integer number, i.e., $\hat{X}_p(\rho_1, \rho_2, \ldots, \rho_n)$ It is assumed that the distances calculated between the sender of the pulses and a respective point where the pulses were reflected is more reliable than the $\hat{X}_p$-coordinates. Since the position and pointing direction of the sender is known due to the positioning data, and the distance is known to its calculation, one can calculate another 3D-coordinate $\hat{X}_{por} = (x_{por}, y_{por}, z_{por})$ for the point of reflection. In general, the point of reflection has to lie on the 3D-surface to cause the reflection and thus, if all parameters of the imaging system were right, the point of reflection has to coincide with some 3D-coordinate of the 3D-surface, $\hat{X}_p = \hat{X}_{por}$. If this is not the case, one is performing a minimisation procedure $$\min_{\rho_1, \rho_2, \ldots, \rho_n} \left\| \hat{X}_p(\rho_1, \rho_2, \ldots, \rho_n) - \hat{X}_{por} \right\|.$$

In the above example of the field of view one has the case n=1 and $\rho_1$ is the field of view, thus the minimisation procedure simplifies to $$\min_{\rho_1} \left\| \hat{X}_p(\rho_1) - \hat{X}_{por} \right\| = \min_{\rho_1} \left\| \hat{X}_p(x_p, y_p, z_p(\rho_1)) - \hat{X}_{por} \right\| = \min_{\rho_1} \left\| z_p(\rho_1) - z_{por} \right\|.$$

The set of parameters of the imaging system can comprise intrinsic camera parameters, for example field of view(s), radial distortion, tangential distortion, offset of optical axis and/or focal length. For using a parameter in the minimisation procedure one has to make a model how this parameter gives influence to the coordinate $\hat{X}_p$. This differs from one imaging system to another imaging system and such a model is preferably build on physical assumptions and by thorough investigations of the behaviour of the imaging system due to changes of the parameter in the model.

In other examples one can also include extrinsic parameters of the imaging system in the set of parameters, for example position and/or pointing direction of the imaging system. Then the method as described above can, for example, be used to improve the accuracy of a positioning and/or navigation system.

If a 3D-surface is calculated from the surface of the Earth, this surface should be treated in a broad sense, i.e. it should not necessarily exclude buildings or other constructions and neither should it necessarily exclude plants.

It is not necessary to calculate a 3D-surface in the above example. In one example the method comprises calculating a point correspondence between points where the pulses were reflected and the corresponding points in the at least two pictures. In one example this is achieved with the help of bundle adjustment and feature point extraction as known to those skilled in the art. By doing this, coordinates and $\hat{X}_p$ and $\hat{X}_{por}$ are provided and the minimisation procedure as described above can be performed.

Figure 5:
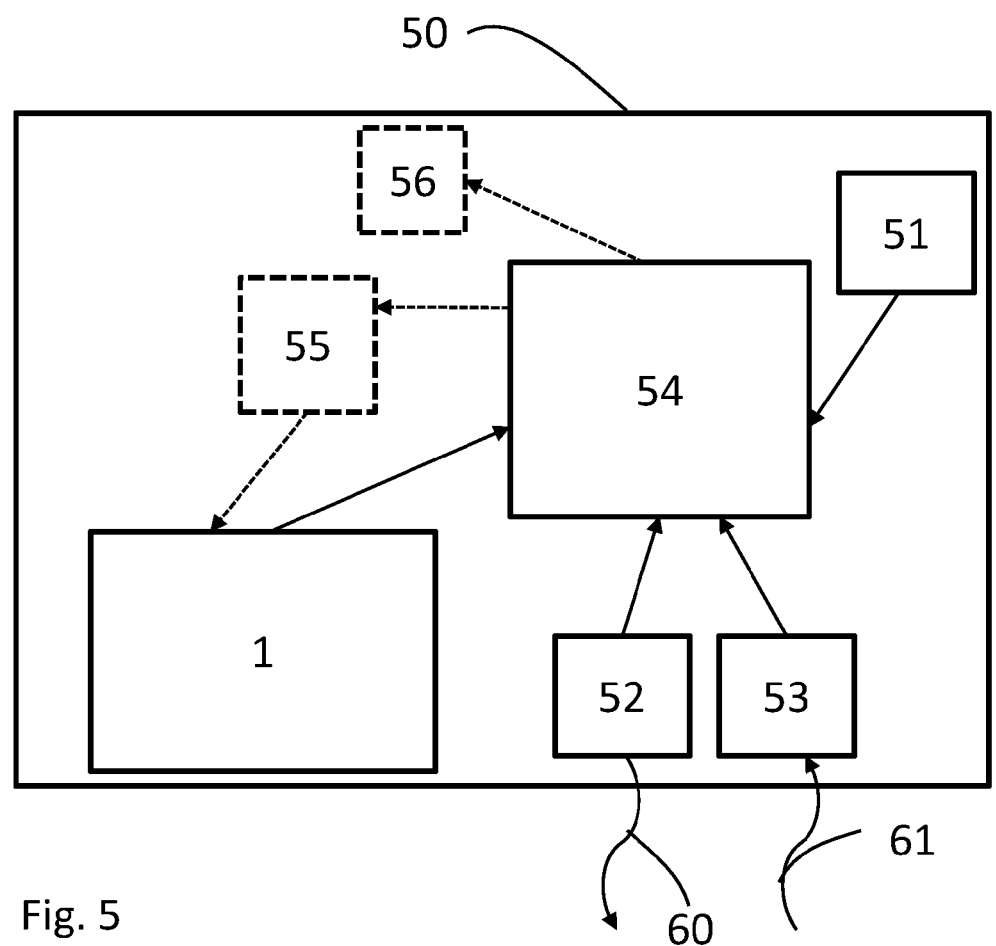
FIG. 5 shows a block diagram of an embodiment of an apparatus according to the invention.

In FIG. 5, an apparatus 50 arranged to take pictures is also arranged to estimate values for a set of parameters of an imaging system 1 of the apparatus 50. The apparatus 50 comprises said imaging system 1, a positioning data unit 51, a sender system 52 arranged to send pulses 60, a detector system 53 arranged to detect reflected pulses 61 and a processing unit 54 arranged to estimate the values for the set of parameters of the imaging system 1. In one example, the arrangement comprises a control unit 55 arranged to control the imaging system 1 based on the values provided by the processing unit 54. In an alternative or additional example, the apparatus comprises presentation means 56 arranged to present information related to the updated values and/or error estimates provided by the processing unit 54. The presentation means 56 are arranged to present the information related to the values for example, visually on a display (not shown in the Figure), orally and/or as a print out.

The imaging system 1 is arranged to take at least two pictures from different positions. The at least two pictures comprise an at least partially overlapping area. The sender system 52 is arranged to send pulses 60 to the at least partially overlapping area. The detector system 53 is arranged to detect reflected pulses 61.

The processing unit 54 is arranged to calculate distances between a sender 52 of the pulses 60 and the respective point where the pulses were reflected based on the travel time of the pulses 60, 61.

The positioning data unit 51 is arranged to provide positioning information. The positioning information may be time stamped. The positioning data unit 51 is arranged to provide position data and a pointing direction of the imaging system 1 and the sender 52 of pulses 60. In one example the positioning data unit 51 comprises a GNSS and an IMU. The processing unit 54 is arranged to associate positioning data to the pictures and to the calculated distance between the reflection point and the sender 52 of the pulses 60 based on the information from the position system 51.

The processing unit 54 is further arranged to calculate a 3D-surface of the at least partially overlapping area based on the at least two pictures. It is further arranged to calculate first information about the area, based on the calculated 3D-surface, the information comprising at least one quantity of the area, the at least one quantity comprising size and/or position. It is also arranged to calculate second information related to the calculated distances to the at least partly overlapping area. The second information comprises at least one quantity of the area. The at least one quantity comprises size and/or position, comparing values for the quantities contained in the first and second information. If the value for at least one quantity of the area obtained from the first information differs from the value for the corresponding at least one quantity of the area obtained from the second information, calculating the values or error estimates for the set of parameters of the imaging system based on the difference.

Figure 6:
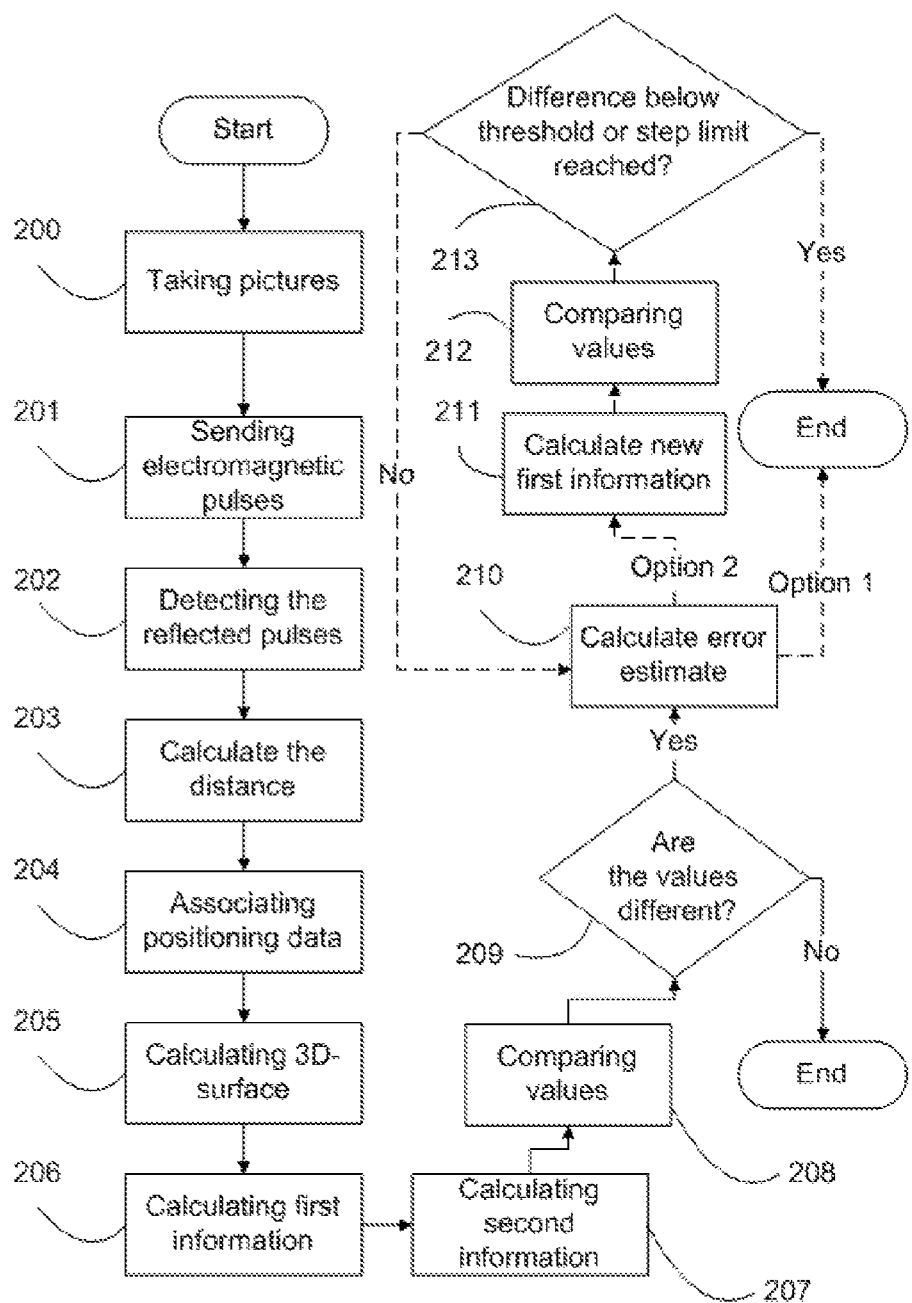
FIG. 6 shows a float chart as an example of a method according to the present invention.

In FIG. 6 a method for estimating values for a set of parameters of an imaging system 1 is shown. At least two pictures are taken by an imaging system 1, where the at least two pictures are taken from different positions and where the at least two pictures comprise an at least partially overlapping area 201. Pulses are sent out to that area 201 and the pulses back-reflected from that area are detected 202. From the travel time of the pulses the distance between the sender 52 and each point from where the pulses were back-reflected is calculated 203.

Positioning data is associated to the pictures and to the distances 204. The positioning data comprises the position of the imaging system and its pointing direction at the time the picture was taken. The positioning data for the distances comprises position and pointing direction of the sender 52 at the time that pulse was sent, which was used to calculate the corresponding distance.

The positioning data does not necessarily have to be available at the time the pictures were taken and/or the pulses were sent. In one example, time data is associated to the pictures and to the pulses as described in FIG. 3. Time data is then also associated to the positioning data unit 51 and kept with the positioning data of the positioning data unit 51 when such data is provided by the positioning data unit 51. The positioning data for the pictures and the distances is than calculated by so called integrated navigation, for example, with the help of a GPS-receiver and an IMU, and provided at a later time then the time the pictures were taken and/or the distances calculated. Integrated navigation is a well known by those skilled in the art.

In one example a 3D-surface is calculated 205 from the at least two pictures. First information is calculated 206, based on the calculated 3D-surface. The first information comprises information about the partially overlapping area. The information about the area comprises at least one of a size and a position.

In another example first information is calculated 206 based on the at least two pictures.

Second information is calculated 207. The second information comprises at least one quantity of the partially overlapping area. The second information is calculated based on the calculated distance between the sender 52 and one or more points of the partially overlapping area. The at least one quantity comprises size and/or position of the area. It is assumed that the second information is more reliable than the first information. The most important measurement parameter for the second information is the travel time of the pulses. The travel time will basically only depend on the distance and the speed of the pulse. Any other effect like, for example, mechanical distortions in the laser or any other sender system will have an impact on the travel time which is in most cases several orders of magnitude lower. Due to the greater reliability it is possible to use the second information to estimate errors and/or update values in the first information and/or in the imaging system 1 used to take pictures which lead to the first information.

The values for the quantities contained in the first and second information are compared 208. If the values differ 209, an updated value and/or an error estimate for at least one parameter of the imaging system 1 is calculated based on the difference 210. For calculating the updated value and/or the error estimate one preferably uses a model of how a parameter or an error of a parameter of the imaging system 1 influences the pictures taken by the imaging system 1 and/or the calculated first information. One example of such a model is explained in the description of FIG. 5, where it is shown how an updated value and/or an error estimate for the field of view of the imaging system 1 can be calculated. However, an updated estimate for any other parameter of the imaging system 1 can be provided by this method as well, as long as this parameter influences the pictures taken by the imaging system 1 or influences the first information. In one example the method is used for estimating an updated value for more than one parameter. This is possible if the parameter influence the pictures and/or the first information differently so that one can decide which influence is due to which parameter. The method can also be used if some of the parameters influence the picture and/or the first information in a similar or even the same manner. Then a model can be used which assumes which influence or at least which part of an influence is due to which parameter.

In one example the method ends after updating parameter values 210, indicated by the arrow named "Option 1" in FIG. 6.

In another example of the method, the method continues after calculating the updated parameter values 210, indicated by the arrow named "Option 2" in FIG. 6. In that example new first information is calculated 211. The values from the new first information and the second information are compared 212. It is checked whether the difference between values of quantities derived from the second information and the new first information is below a certain threshold or whether a certain number of iterative steps have been performed 213. If not, a new updated parameter value is calculated 210. A method according to this example might be especially useful if several parameters of an imaging system 1 influence pictures taken by the imaging system 1 or first information in a similar or at least partly in the same way. Then this iterative process can be useful to find updated values for a set of parameters which minimise the difference in the values for quantities derived from first information and the corresponding value derived from second information.

It should be noted that the steps comprised in the method described above by no means are limited to the order as shown in the picture. Even other orders are possible. For example the steps where only the imaging system 1 and/or pictures taken by the imaging system 1 and/or the 3D-surface derived from the pictures are involved can be taken independent of the steps where only pulses and/or distances derived from them and/or other information derived from them is involved.

The invention claimed is:

1. A method for estimating values for a set of parameters of an imaging system, the method comprising:
    taking at least two pictures with the imaging system, where the at least two pictures are taken from different positions and where the at least two pictures comprise an at least partially overlapping area;
    sending out pulses to the at least partially overlapping area with a sender system that is different from the imaging system;
    detecting the reflected pulses by a detector system that is different from the imaging system and calculating distances between the sender system and the respective point where the pulses were reflected based on the travel time of the pulses;
    associating positioning data to the pictures and to the calculated distance between the points where the pulses were reflected and the sender of the pulses, said positioning data comprising a position and pointing direction of the imagining system and the sender of the pulses;
    calculating first information about the area, based on the at least two pictures, the information comprising at least one quantity of the area, the at least one quantity comprising at least one of size or position,
    calculating second information related to the calculated distances to the at least partly overlapping area, the second information comprising at least one quantity of the area, the at least one quantity comprising at least one of size or position;
    comparing values for the at least one quantity contained in the first information and the at least one quantity contained in the second information; and
    if the value for at least one quantity of the area obtained from the first information differs from the value for the corresponding at least one quantity of the area obtained from the second information, calculating at least one of values or an error estimate for the set of parameters of the imaging system based on the difference,
    wherein:
        the at least one quantity contained in the first information is determined based on the at least two pictures taken by the imaging system; and
        the at least one quantity contained in the second information is determined separate from the determination of the at least one quantity contained in the first information, the at least one quantity contained in the second information being determined based on the calculated distance based on the travel time of pulses sent out by the sender system and received by the detector system.

2. A method according to claim 1, further comprising:
    calculating a 3D-surface of the at least partially overlapping area based on the at least two pictures; and
    calculating the first information about the area based on the calculated 3D-surface.

3. A method according to claim 1, the method further comprising calculating a point correspondence between points where the pulses were reflected and the corresponding points in the at least two pictures.

4. A method according to claim 1, further comprising
    calculating new first information, where the set of parameters of the imaging system is updated with the obtained values for the set of parameters;
    comparing the values for the quantities contained in the first and second information;
    if the value for at least one quantity of the area obtained from the new first information differs from the corresponding value of the second information, providing new at least one of values or error estimate for the set of parameters of the imaging system based on the difference; and
    repeating the above steps until the difference is below a pre-determined threshold or until a pre-determined number of iterative steps has been reached.

5. A method according claim 1, where the value estimation is performed during operation of the imaging system.

6. A method according to claim 1, where the value estimation is used to error-correct the parameters of the imaging system and such error-corrected parameters are used as new input parameters when further operating the imaging system.

7. A method according to claim 1, where the value estimation is performed after operation of the imaging system.

8. A method according to claim 1, where the imaging system is used to take pictures of the surface of the Earth.

9. A method according to claim 1, where the set of parameters comprises one or more of the following parameters: field of view, radial distortion, tangential distortion, focal length, offset of optical axis.

10. A method according to claim 1, where the set of parameters of the imaging system comprise at least one of position or pointing direction of the imaging system.

11. A method according to claim 1, where the pulses are laser pulses.

12. Computer program comprising a program code for estimating values for a set of parameters of an imaging system comprising the steps of claim 1.

13. Computer program product comprising a program code stored on a non-transitory computer readable media for estimating values for a set of parameters of an imaging system comprising the steps of claim 1.

14. An apparatus for taking pictures, comprising:
an imaging system arranged to take at least two pictures from different positions, wherein
the at least two pictures comprise an at least partially overlapping area;
a sender system arranged to send pulses to the at last partially overlapping area;
a detector system arranged to detect reflected pulses, wherein the sender system and the detector system are different from the imaging system;
a processing unit arranged to calculate distances between a sender of the pulses and the respective point where the pulses were reflected based on the travel time of the pulses;
a positioning data unit arranged to associate positioning data to the pictures and to the calculated distance between the reflection point and the sender of the pulses, said positioning data comprising a position and pointing direction of the imagining system and the sender of the pulses; and
the processing unit also arranged to calculate a 3D-surface of the at least partially overlapping area based on the at least two pictures, and to calculate first information about the area, based on the calculated 3D-surface, the information comprising at least one quantity of the area, the at least one quantity comprising at least one of size or position, wherein in that the processing unit is further arranged to calculate second information related to the calculated distances to the at least partly overlapping area, the second information comprising at least one quantity of the area, the at least one quantity comprising at least one of size or position, comparing values for the quantities contained in the first and second information, if the value for at least one quantity of the area obtained from the first information differs from the value for the corresponding at least one quantity of the area obtained from the second information, calculating at least one of values or error estimates for the set of parameters of the imaging system based on the difference,
wherein:
the at least one quantity contained in the first information is determined based on the at least two pictures taken by the imaging system; and
the at least one quantity contained in the second information is determined separate from the determination of the at least one quantity contained in the first information, the at least one quantity contained in the second information being determined based on the calculated distance based on the travel time of pulses sent out by the sender system and received by the detector system.

15. An apparatus according to claim 14, where the sender system comprises at least one of a laser system, a radar system, or a sonar system.

16. A moving platform comprising an apparatus according to claim 14, where the platform is moving to allow the imaging system taking pictures from different positions.

17. A platform according to claim 16, where the platform is at least one of an aircraft or a satellite.

18. An apparatus according to claim 15, wherein the detector system comprises a corresponding laser detection system, radar detection system, or sonar detection system.

19. An apparatus according to claim 14, wherein the processing unit comprises a computer.

\* \* \* \* \*